(12) United States Patent
Jaenecke et al.

(10) Patent No.: US 7,028,093 B2
(45) Date of Patent: Apr. 11, 2006

(54) METHOD OF TRANSFERRING USER DATA PACKETS

(75) Inventors: Peter Jaenecke, Straubenhardt (DE); Gabriele Schwoerer, Weil der Stadt (DE); Gunther Jacob, Rutesheim (DE); Karsten Oberle, Mannheim (DE); Jürgen Otterbach, Stuttgart (DE); Hardy Halbauer, Ettlingen (DE)

(73) Assignee: Alcatel, Paris (FR)

( * ) Notice: Subject to any disclaimer, the term of this patent is extended or adjusted under 35 U.S.C. 154(b) by 659 days.

(21) Appl. No.: 09/911,519

(22) Filed: Jul. 25, 2001

(65) Prior Publication Data

US 2002/0016859 A1    Feb. 7, 2002

(30) Foreign Application Priority Data

Aug. 5, 2000 (DE) ................. 100 38 314

(51) Int. Cl.
*G06F 15/16* (2006.01)
(52) U.S. Cl. ............... 709/230; 709/228; 709/231
(58) Field of Classification Search ............ 370/441; 709/231, 230

See application file for complete search history.

(56) References Cited

U.S. PATENT DOCUMENTS

| | | | |
|---|---|---|---|
| 5,943,331 A | 8/1999 | Lavean | |
| 6,067,292 A | 5/2000 | Huang et al. | |
| 6,088,335 A * | 7/2000 | I et al. | 370/252 |
| 6,101,176 A * | 8/2000 | Honkasalo et al. | 370/335 |
| 6,356,555 B1 * | 3/2002 | Rakib et al. | 370/441 |
| 6,452,936 B1 * | 9/2002 | Shiino | 370/441 |
| 6,724,740 B1 * | 4/2004 | Choi et al. | 370/355 |

OTHER PUBLICATIONS

Bush, Steve. "S-CDMA: Two-way data over cable," Jan. 29th, 1997. ElectronicsWeekly.com. http://www.electronicsweekly.com/Article6836.htm.*
Nordbotten, Agne. "LDMS Systems and their Application." Jun., 2000. IEEE Communications Magazine. pp. 150-154.*
Shihe Li: "Key technologies in SCDMA wireless access" 1997 Asia-Pacific Microwave Conference Proceedings APMC '97, Wireless Communications in the Era of Information (IEEE CAT.No. 97$^{th}$8336) City Unvi. Hong Kong, Bd. 1, Dec. 2, 1997, pp. 169-172, vol. 1, XP002304616.
Hosseinian M et al: "A multiuser detection scheme with pilot symbol-aided channel estimation for synchronous CDMA systems" Vehicular Technology Conference, 1998. VTC 98, 48$^{th}$ IEEE Ottawa, Ont., Canada May 18-21, 1998, New York, NY USA, IEEE, US May 18, 1998, pp. 796-800, XP010288092.

* cited by examiner

Primary Examiner—Rupal Dharia
Assistant Examiner—Nicholas R. Taylor
(74) Attorney, Agent, or Firm—Sughrue Mion, PLLC

(57) ABSTRACT

It is the object of the invention to make available a method of transferring user data packets from a terminal to a mainframe of an S-CDMA point-to-multipoint system, in which the data transfer is optimized. The method includes the steps of a repeated transmission of reference data packets coded with pilot codes for the duration of the connections between terminals and a mainframe, wherein the reference data packets contain previously known information, and the transmission of user data packets coded with communication codes include the user information to be transferred. In a preferred embodiment of the invention the user data packets are coded synchronously in time to the reference data packets, superimposed on these, and then modulated. Each terminal is allocated a pilot code, and at least one communication code.

21 Claims, No Drawings

METHOD OF TRANSFERRING USER DATA PACKETS

TECHNICAL FIELD

The invention relates to a method of transferring user data packets from a terminal to a mainframe of an S-CDMA point-to-multipoint system, as well as the mainframe for the S-CDMA point-to-multipoint system and a transmitting device. The invention is based on German priority application 100 38 314.9 which is hereby incorporated by reference.

BACKGROUND OF THE INVENTION

Point-to-multi-point systems in the access range are constructed, e.g., as HFC, HFR or LMDS systems and usually comprise a mainframe, e.g., designed as a base station to which several terminals are connected; HFC=Hybrid Fibre Coax, HFR=Hybrid Fibre Radio, LMDS=Local Multipoint Distribution Services. In all these point-to-multipoint systems CDMA can be used as the access method: CDMA=Code Division Multiple Access. A particular configuration of the CDMA is represented by the S-CDMA; S-CDMA=Synchronous CDMA.

With the S-CDMA communication codes are allocated to the terminals for transferring user data packets to the mainframe. All the communication codes are, for example, CDMA codes of one code family. The communication codes are used to transfer information from the terminals to the mainframe. The user data packets to be transferred contain on the one hand, e.g., the address of the terminal, synchronisation signals, further administrative information, etc., and on the other hand the user information to be transferred. Each user data packet to be transferred, which contains user bits, is coded with a communication code before sending. Coding takes place, e.g., by multiplying in bits by the communication code. Each communication code makes a transfer channel available. By coding each user data bit to be transferred is straddled. On the receiving side straddling is carried out by re-multiplication by the same communication code. In addition to the coding an HF modulation can be carried out; HF=High Frequency. On the receiving side a corresponding demodulation is carried out.

In many cases of application, e.g., for surfing the Internet, the user data packets are not transferred continuously to the mainframe, but discontinuously, i.e. in a so-called bursty way. With this kind of data transfer each time a user data packet is received the mainframe has to be re-synchronised to it. The user data packet comprises a relatively large preamble for this purpose. With the LMDS system this preamble is used, e.g., to determine the frequency offset and the phase of the radio signal received from a terminal. The higher the bit rate, the longer the preamble selected must be.

Yet it is precisely in the area of radio that few transfer channels and a limited capacity are available. A relatively long preamble reduces the data rate and blocks transfer capacity.

SUMMARY OF THE INVENTION

It is the object of the invention to make available a method of transferring user data packets from a terminal to a mainframe of an S-CDMA point-to-multipoint system, in which data transfer is optimised.

This object ;s achieved by a method of transferring user data packets from a terminal to a mainframe of an S-CDMA point to multi-point system, comprising the steps of a repeated transmission of a reference data packet coded with a pilot code for the duration of the connection between terminal and mainframe, wherein the reference data packet contains previously known information, and the sequential sending of user data packets coded with at least one communication code, which in each case comprise the user information to be transferred, as well as a mainframe for an S-CDMA point to multi-point system for transferring user data packets from terminals to the mainframe, said mainframe being suitable for repeatedly receiving a reference data packet coded with a pilot code and containing previously known information on each connection to a terminal and for deriving synchronisation information from the signal of the reference data packet and the mainframe is suitable for receiving user data packets, coded with at least one communication code and comprising user information on each connection to a terminal; and a transmitting device for an S-CDMA system, comprising a first coder for coding a reference data packet with a pilot code and a second coder for coding user data packets with at least one communication code are provided, wherein the reference data packet contains previously known information and the user data packets comprise the user information to be transferred and an adder is provided for adding the output signals of the coders.

The invention is particularly characterised in that on the one hand pilot codes and reference data packets are used in addition to the communication codes and the user data packets and on the other hand user data packets with a considerably shorter preamble, ideally without preamble, are used. The reference data packets are transferred continuously for the duration of the connections of the terminals to the mainframe. This means that for each connection of a terminal to the mainframe, e.g., a base station, a particular reference data packet is repeatedly transferred continuously or at predetermined intervals of time to the mainframe. The reference data packet comprises only previously known information. This information can be selected at will and be, e.g., the address of the terminal, the preamble, a previously known sequence of bits which simulates noises, etc. The reference data packets have the object of putting the mainframe in a position to maintain synchronisation also during the times at which the terminals are not transferring user data packets. The mainframe and the respective terminal are thus always synchronised during the entire duration of the connection. If a user data packet is being transferred from the terminal to the mainframe, ideally there is no need for any synchronisation. The mainframe can begin evaluation immediately. The user data packets therefore ideally no longer need a preamble. Therefore the limited transfer capacity in the system can be better utilised.

In a transmission device for an S-CDMA system arranged in a terminal a first coder for coding a reference data packet with a pilot code and a second coder for coding user data packets with at least one communication code are provided. The reference data packet contains previously known information and the user data packets comprise the user information to be transferred. The coding of the reference data packet with the pilot code takes place synchronously in time to the coding of a user data packet with a communication code. Further, an adder is provided for adding the output signals of the coders. Furthermore, a modulator is provided for HF modulation of the output signals of the adder; HF=High Frequency. From each reference data packet and user data packet or user data packets coded synchronously in time a summation signal is formed, which after subsequent modulation is transmitted to the mainframe. Reference data packets and user data packets are thus transferred synchronously in time to one another. Therefore a superimposed transmission of reference data packets and user data packets occurs. The transmission of the reference data packets may not or only to a minor extent impair the transfer of the user data packets. The pilot codes are therefore, e.g., CDMA codes and the communication codes CDMA codes, wherein the pilot codes originate from a different CDMA code family from the communication codes and wherein no pilot code is identical to any communication code. The pilot codes are, e.g., orthogonal or not orthogonal to one another. The communication codes on the other hand are orthogonal to one another. The pilot codes can also originate from code families which contain no CDMA codes. Additionally the signal levels of reference data packets and user data packets selected can be different. For example higher signal levels of the user data packets are selected than the signal levels of the reference data packets, e.g. by a factor of two.

An advantage of the invention is that the pilot codes can additionally be used to improve the performance of the system. For example, a measuring unit is provided in the mainframe to determine from the received reference data packets the actual signal-to-noise ratio for each connection to a terminal. Furthermore, a measuring and control unit can be provided in the mainframe for measuring the signal levels of the received reference data packets. The mainframe telemetrically regulates the transmission levels of the terminals, the signal levels of the reference data packets and/or the signal levels of the user data packets as a function of the measured signal levels.

BEST MODE FOR CARRYING OUT THE INVENTION

Below an embodiment example of the invention is described.

An S-CDMA LMDS system is a cellular radio system. In each cell there is a base station which takes on control of the cell. The base station communicates with terminals located in the cell. Each terminal uses a reference data packet coded with a pilot code to maintain synchronisation to the base station and at least one communication code for coding the user data packets to be transferred. The user data packets comprise, e.g., polling signals for service-on-demand applications, selection signals for Internet sites, telephone signals, image data, etc. Each terminal is allocated a pilot code and at least one communication code. Allocation of the pilot code takes place, e.g., once centrally when the system is taken into operation or, when a connection is installed, in each case anew for the duration of the connection. Allocation of the communication code takes place, e.g., when a connection is installed, in each case anew for the duration of the connection or for the duration of the transfer of a user data packet. Orthogonal CDMA codes are used as communication codes. CDMA codes are also used as pilot codes, for example, though from a different code family, wherein no pilot code is identical to any communication code. The transfer channel for the reference data packet is, e.g., permanently connected through for the duration of a connection. This means that reference data packets with identical content are repeatedly transmitted continuously from a terminal sequentially in time and without gaps in time between the reference data packets. Alternatively the transfer channel for the reference data packets is connected through at equidistant intervals for the duration of a connection. This means that reference data packets of identical content are repeatedly transmitted from a terminal sequentially in time and with gaps in time between the reference data packets. In this case the gaps in time can be used to transfer reference data packets of at least one other terminal. One and the same pilot code can therein be used for both terminals. This principle can sometimes be extended to further terminals, whereby the number of pilot codes is minimised. Transfer of reference data packets can also be halted during the periods of time when user data packets are being transferred. Then either reference data packets or user data packets are transmitted. There is then no superimposed transmission of a reference data packet and a user data packet. In the mainframe synchronisation information and information on the signal quality can be derived from both the reference data packets and the user data packets. Thus in particular synchronisation is also maintained during the periods of time or in the time slots when no reference data packets are being transmitted. In this case the time slots can be used for transferring reference data packets of at least one other terminal, wherein the number of pilot codes could be further minimised.

The transfer channel for the user data packets is advantageously only connected through in those periods of time when user data packets are being transmitted. For the transfer of a user data packet several communication codes can, for example, be used at the same time. The variously coded parts of the user data packet are then superimposed by addition and then transmitted together with the reference data packet. If no user data packets are being transferred from a terminal, the corresponding communication codes can be used for the transfer of user data packets of other terminals. In burst operation, e.g., surfing the Internet, one communication code is sufficient, for example, for a specific number of terminals.

Each reference data packet comprises information known in advance, e.g. the address of the terminal, a preamble, a pre-defined bit sequence. For the duration of the connection to the base station the reference data packet is transmitted repeatedly from the terminal, e.g., continuously or at equidistant intervals of time; with transmission at equidistant intervals of time, e.g., once a second or once every 10 seconds. The base station therefore always receives the same reference data packet of the terminal sequentially in time. The base station can detect this reference data packet in a simple manner, as it always has the same content, namely the information previously known to the base station. The base station has a synchronisation unit in which it determines and evaluates the frequency and the phase of the reference data packet. The synchronisation unit is, for example, able to carry out chip phase synchronisation and RF phase synchronisation; RF=radio frequency. The latter serves, e.g., for coherent demodulation.

The user data packets to be transferred are coded with at least one communication code and transmitted parallel in time to the reference data packets and superimposed on these. Base station and terminal are synchronised for the duration of a connection by the reference data packets and evaluation thereof. The user data packets can be transmitted at any chosen times taking into consideration the timing pattern. Synchronisation of the base station on receipt of a user data packet is no longer necessary. Evaluation can take place immediately.

Besides the function of maintaining synchronisation in periods of time when no user data packets are being transferred, the reference data packets have an optional additional function. Each reference data packet can be used to improve the performance in the system. By measuring the signal-to-noise ratio of a reference data packet the transfer quality of a channel can be determined. If the measured signal-to-noise ratio is below a predetermined lower threshold, the base station informs the terminal of this and requests it to raise the transmitting level for the next reference data packets. If the measured signal-to-noise ratio is above a predetermined upper threshold, the base station informs the terminal of this and requests it to lower the transmitting level for the next reference data packets. If the measured signal-to-noise ratio is within the lower and upper threshold no alteration takes place. The signal-to-noise ratio of a reference data packet can be used as the measure for the signal-to-noise ratio of a user data packet. The requests to raise or lower the signal levels of the reference data packets can therefore also be used for the user data packets. If a terminal is, e.g. requested to raise the signal level of the next reference data packets the signal levels of the next user data packets are also automatically raised.

Instead of measuring the signal-to-noise ratios the absolute values of the received signal levels can be measured. If a received signal level is below a lower threshold the terminal is requested to raise the power of the transmission and if it is above an upper threshold it is requested to lower the transmission power. Both measurement and request can relate to reference data packet and/or user data packet. The base station thus carries out a so-called power levelling.

The invention can be applied to all point-to-multipoint systems in the access range, such as, e.g., HFC, HFR, LMDS. Instead of in a base station, as in the embodiment example, one, two or more of the following functions can also first be carried out in a superimposed unit: synchronisation, measuring the signal-to-noise ratio, measuring the signal levels, power levelling, decoding, demodulation.

The invention claimed is:

1. A method of transferring user data packets from a terminal to a mainframe of an S-CDMA point to multi-point system, comprising: repeatedly transmitting a reference data packet coded with a pilot code for the duration of the connection between terminal and mainframe, wherein the reference data packet contains previously known information, and sequentially sending user data packets coded with at least one communication code different from said pilot code, which user data packets in each case comprise the user information to be transferred.

2. The method according to claim 1, wherein each terminal is allocated a pilot code, at least for the duration of a connection, and each terminal is allocated at least one communication code at least for the duration of the transfer of a user data packet.

3. The method according to claim 1, wherein the coding of the reference data packs with the pilot code takes place synchronously in time to the coding of the user data packets with the at least one communication code.

4. The method according to claim 3, wherein from each reference data packet and user data packet or user data packets synchronously coded in time, a summation signal is formed which, after subsequent modulation, is transmitted to the mainframe.

5. The method according to claim 1, wherein at the times at which a user data packet is being transmitted, no reference data packet is transmitted.

6. The method according to claim 1 wherein the pilot codes are CDMA codes and the communication codes are CDMA codes, wherein the pilot codes originate from a different CDMA code family from the communication codes and wherein no pilot code is identical to any communication code.

7. The method according to claim 1, wherein the pilot codes are orthogonal to one another and the communication codes are orthogonal to one another.

8. The method according to claim 1, wherein the pilot codes are not orthogonal to one another and the communication codes are orthogonal to one another.

9. A mainframe for an S-CDMA point to multi-point system for transferring user data packets from terminals to the mainframe, said mainframe repeatedly receiving a reference data packet coded with a pilot code and containing previously known information on each connection to a terminal and deriving synchronization information from the signal of the reference data packet, wherein the mainframe receives user data packets, coded with at least one communication code different from said pilot code, comprising user information on each connection to a terminal.

10. The mainframe according to claim 9, said mainframe being suitable for deriving from the signal of the reference data packet information on the signal quality.

11. The mainframe according to claim 9, comprising a control unit to allocate pilot codes and communication codes to terminals, wherein a pilot code and at least one communication code is assigned by the control unit for each connection of a terminal to the mainframe at least for the duration of the transfer of a user data packet.

12. The mainframe according to claim 9, comprising at least one measuring unit to determine the signal-to-noise ratio for each connection to a terminal from the received pilot codes.

13. The mainframe according to claim 9, comprising at least one measuring and control unit provided to measure the signal levels of the received reference data packets and for telemetric regulation of the transmitting levels of the terminals for the reference data packets and/or the user data packets as a function of the measured signal levels.

14. The mainframe according to claim 9, said mainframe being constructed as a base station for an LMDS system.

15. A transmitting device for an S-CDMA system, comprising a first coder for coding a reference data packet with a pilot code and a second coder for coding user data packets with at least one communication code different from said pilot code, wherein the reference data packet contains previously known information and the user data packets comprise the user information to be transferred and an adder is provided for adding the output signals of the coders.

16. The transmitting device according to claim 15, comprising a modulator for HF modulation of the output signals of the adder.

17. The mainframe according to claim 9, repeatedly receiving only one reference data packet coded with a pilot code on each connection to a terminal.

18. The transmitting device according to claim 15, wherein only one reference data packet is coded by the first coder on each connection to a mainframe.

19. The method of claim 1, wherein the mainframe and the terminal are always synchronized during the entire duration of the connection.

20. The mainframe of claim 9, wherein the mainframe and the terminal are always synchronized during the entire duration of the connection.

21. The transmitting device of claim 15, wherein the transmitting device is always synchronized to a mainframe during the entire duration of a connection thereto.

* * * * *